United States Patent
Ozaki

(10) Patent No.: US 7,848,582 B2
(45) Date of Patent: Dec. 7, 2010

(54) IMAGE PROCESSING METHOD, IMAGE PROCESSING APPARATUS, PROGRAM OF IMAGE PROCESSING METHOD AND RECORDING MEDIUM RECORDING PROGRAM OF IMAGE PROCESSING METHOD

(75) Inventor: Koji Ozaki, Kanagawa (JP)

(73) Assignee: Sony Corporation (JP)

(*) Notice: Subject to any disclaimer, the term of this patent is extended or adjusted under 35 U.S.C. 154(b) by 1032 days.

(21) Appl. No.: 11/635,370

(22) Filed: Dec. 7, 2006

(65) Prior Publication Data

US 2007/0147691 A1 Jun. 28, 2007

(30) Foreign Application Priority Data

Dec. 7, 2005 (JP) .............. P2005-353004

(51) Int. Cl.
*G06K 9/36* (2006.01)
(52) U.S. Cl. ...................... 382/233; 708/203
(58) Field of Classification Search ............ 382/232, 382/233; 708/203
See application file for complete search history.

(56) References Cited

U.S. PATENT DOCUMENTS

| | | | |
|---|---|---|---|
| 6,028,639 A * | 2/2000 | Bhatt et al. ............. | 348/441 |
| 6,208,689 B1 * | 3/2001 | Ohira et al. ............ | 375/240.12 |
| 6,584,200 B1 | 6/2003 | Tanaka et al. | |
| 6,603,818 B1 * | 8/2003 | Dress et al. ............ | 375/295 |
| 2005/0201464 A1 * | 9/2005 | Lee ...................... | 375/240.16 |

FOREIGN PATENT DOCUMENTS

| | | |
|---|---|---|
| JP | 11-298878 A | 10/1999 |
| JP | 2005-228073 A | 8/2005 |

* cited by examiner

*Primary Examiner*—Vikkram Bali
*Assistant Examiner*—Eueng-Nan Yeh
(74) *Attorney, Agent, or Firm*—Lerner, David, Littenberg, Krumholz & Mentlik, LLP

(57) ABSTRACT

An image processing method for decoding input encoded image data, which has undergone encoding processing by a predetermined format, image processing the decoded image data, and encoding the image-processed data to create output encoded data includes repeating the process of decoding, image processing and encoding processing and outputting the image data in image processing units subject to the image processing; and sorting the encoded data obtained from the repeated processing step and creating the output encoded data in an order defined by the format of the output encoded data for performing encoding processing on one picture plane. In this case, the repeated processing step includes decoding the input encoded data in the image processing units and outputting image data, image processing the decoded image data in the image processing units, and encoding processing the image-processed data in encoding processing units.

9 Claims, 17 Drawing Sheets

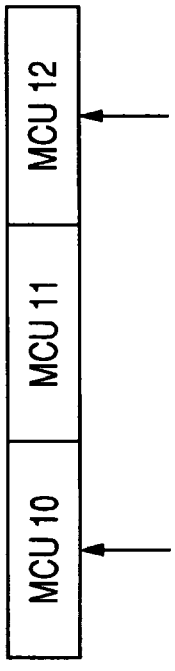
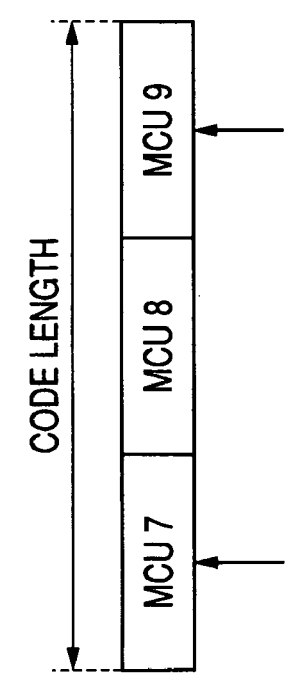
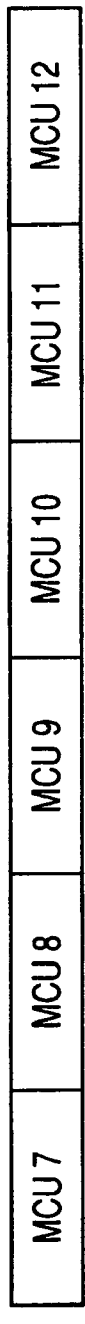
FIG. 9A
FIG. 9B
FIG. 9C

IMAGE PROCESSING METHOD, IMAGE PROCESSING APPARATUS, PROGRAM OF IMAGE PROCESSING METHOD AND RECORDING MEDIUM RECORDING PROGRAM OF IMAGE PROCESSING METHOD

CROSS-REFERENCE TO RELATED APPLICATIONS

The present application claims priority from Japanese Patent Application No. JP 2005-353004 filed on Dec. 7, 2005, the disclosure of which is hereby incorporated by reference herein.

BACKGROUND OF THE INVENTION

1. Field of the Invention

The present invention relates to an image processing method, an image processing apparatus, a program of the image processing method and a recording medium recording the program of the image processing method and may be applicable to a digital still camera, for example. According to the invention, encoded data pieces are sorted after decoding processing, image processing and encoding processing are performed on sequentially input encoded data pieces in image processing units, whereby the capacity of a buffer memory that temporarily stores an image processing result can be reduced.

2. Description of the Related Art

In the past, an imaging apparatus such as a digital still camera performs encoding processing on an imaging result by a scheme such as Joint Photographic Coding Experts Group (JPEG), for example, and records the encoded data based on the processing result on a recording medium. In accordance with an operation by a user, the imaging apparatus decodes and performs image processing on the imaging result recorded on the recording medium and then performs encoding processing again and records the image processing result on the recording medium.

The image processing here may include rotation processing on an image, scaling-up/down processing on an image by conversion of resolution, which is called resizing, and trimming processing. Imaging results recorded on a recording medium are sequentially extracted in image processing units based on the block size suitable for image processing and in an image processing order. On the other hand, the encoding processing such as JPEG has a format defining that encoding processing is performed in encoding processing units including macro blocks sequentially in a raster scanning order.

Thus, an imaging apparatus stores image-processed imaging results in a buffer memory once for one picture plane and then performs encoding processing thereon and records them on a recording medium.

FIG. 16 is a flowchart showing a series of steps relating to the image processing including resizing and trimming processing. An imaging apparatus starts the processing steps in accordance with an operation by a user in step SP1, which is followed by step SP2 where an imaging result recorded on a recording medium is decoded. Thus, image data based on the imaging results in an image processing unit, which is a block size subject to image processing, can be obtained.

In the next step SP3, the obtained image data is recorded in a buffer memory after resizing processing, for example, thereon. In the next step SP4, whether any unprocessed part remains or not is determined. Here, if the determination result is affirmative, the imaging apparatus returns to step SP2.

Thus, in this case, the imaging apparatus repeats the processing steps SP2-SP3-SP4-SP2 in image processing units in an imaging processing order. When all image processing units have been completely processed, the determination result in step SP4 becomes denial. Then, the processing moves to step SP5. Hence, the imaging apparatus image-processes and stores imaging results for one picture plane in the buffer memory. Then, in step SP5, the image processing results stored in the buffer memory undergo encoding processing and are recorded on a recording medium. Then, the processing moves to step SP6 where the processing ends.

FIG. 17 shows a case that an image is scaled down by resizing. The imaging apparatus image-processes an imaging result recorded on a recording medium in image processing units including the shown partial images 1, 2 and 3 resulting from the horizontal equal division of the original image based on an imaging result into three. Then, the image processing results are stored and held in the buffer memory, and the processing results for one picture plane are stored in the buffer memory. After that, the processing results stored in the buffer memory are sequentially encoded in encoding processing units and are recorded on a recording medium.

JP-A-11-298878 discloses a construction of the encoding processing in which MPEG streams are sorted and are scrambled.

By the way, in order to store and perform encoding processing on the image-processed imaging results for one picture plane in a buffer memory, the buffer memory may require a memory with a large capacity enough for holding images based on the image processing results for one picture plane. Therefore, the capacity of the buffer memory for temporarily holding image processing results may be increased, which is a problem.

SUMMARY OF THE INVENTION

Accordingly, it is desirable to propose an image processing method, image processing apparatus, program of the image processing method and recording medium recorded with the program of the image processing method, which can reduce the capacity of a buffer memory that temporarily stores image processing results in a construction in which the imaging results, for example, undergo decoding processing, image processing and encoding processing.

According to an embodiment of the present invention, there is provided an image processing method for decoding input encoded image data, which has undergone encoding processing by a predetermined format, image processing the decoded image data, and encoding the image-processed data to create output encoded data, the method including repeating the process of decoding, image processing and encoding processing and outputting the image data in image processing units subject to the image processing; and sorting the encoded data obtained from the repeated processing step and creating the output encoded data in an order defined by the format of the output encoded data for performing encoding processing on one picture plane, wherein the repeated processing step includes decoding the input encoded data in the image processing units and outputting image data; image processing the decoded image data in the image processing units; and encoding processing the image-processed data in encoding processing units.

According to another embodiment of the invention, there is provided an image processing apparatus for decoding input encoded image data, which has undergone encoding processing by a predetermined format, image processing the decoded image data, and encoding the image-processed data to create output encoded data, the apparatus including a repeated processing section operable to repeat the process of decoding, image processing and encoding processing and outputting the image data in image processing units subject to the image processing; and a sorting section operable to sort the encoded data obtained from the repeated processing section and to create the output encoded data in the order defined by the format of the output encoded data for performing encoding processing on one picture plane, wherein the repeated processing section includes a decoding section operable to decode the input encoded data in the image processing units and to output image data; an image processing section operable to image process the decoded image data in the image processing units; and an encoding section operable to encode process the image-processed data in encoding processing units.

According to another embodiment of the invention, there is provided a program for causing computing processing means to execute an image processing method for decoding input encoded image data, which has undergone encoding processing by a predetermined format, image-processing the decoded image data, and encoding the image-processed data to create output encoded data, the method including repeating the process of decoding, image processing and encoding processing and outputting the image data in image processing units subject to the image processing; and sorting the encoded data obtained from the repeated processing step and creating the output encoded data in an order defined by the format of the output encoded data for performing encoding processing on one picture plane, wherein the repeated processing step includes decoding the input encoded data in the image processing units and outputting image data; image processing the decoded image data in the image processing units; and encoding processing the image-processed data in encoding processing units.

According to another embodiment of the invention, there is provided a recording medium recorded with a program for causing computing processing means to execute an image processing method for decoding input encoded image data, which has undergone encoding processing by a predetermined format, image processing the decoded image data, and encoding the image-processed data to create output encoded data, the method including repeating the process of decoding, image processing and encoding processing and outputting the image data in image processing units subject to the image processing; and sorting the encoded data obtained from the repeated processing step and creating the output encoded data in an order defined by the format of the output encoded data for performing encoding processing on one picture plane, wherein the repeated processing step includes decoding the input encoded data in the image processing units and outputting image data; image processing the decoded image data in the image processing units; and encoding processing the image-processed data in encoding processing units.

Under the construction of the image processing method for decoding input encoded image data, which has undergone encoding processing by a predetermined format, image processing the decoded image data, and encoding the image-processed data to create output encoded data, the method including repeating the process of decoding, image processing and encoding processing and outputting the image data in image processing units subject to the image processing, and sorting the encoded data obtained from the repeated processing step and creating the output encoded data in an order defined by the format of the output encoded data for performing encoding processing on one picture plane, wherein the repeated processing step includes decoding the input encoded data in the image processing units and outputting image data, image processing the decoded image data in the image processing units, and encoding processing the image-processed data in encoding processing units, a buffer memory that temporarily holds an image processing result subject to encoding processing may be required to temporarily hold image data only for each image processing unit, which can reduce the capacity. Thus, in the construction for performing decoding processing, image processing and encoding processing on an imaging result, for example, the capacity of the buffer memory that temporarily stores an image processing result can be reduced.

Therefore, an image processing apparatus, program of the image processing method and recording medium recorded the program of the image processing method can be provided which can reduce the capacity of a buffer memory that temporarily stores an image processing result in the construction for performing decoding processing, image processing and encoding processing on an imaging result, for example.

According to the embodiments of the invention, the capacity of a buffer memory that temporarily stores an image processing result can be reduced in the construction for performing decoding processing, image processing and encoding processing on an imaging result, for example.

BRIEF DESCRIPTION OF THE DRAWINGS

FIGS. 9A to 9C are schematic diagrams for describing processing of sorting encoded data pieces in a macro block;

DETAILED DESCRIPTION

With reference to drawings, embodiments of the invention will be described below in detail.

First Embodiment

[1] Construction of Embodiment

Figure 2:
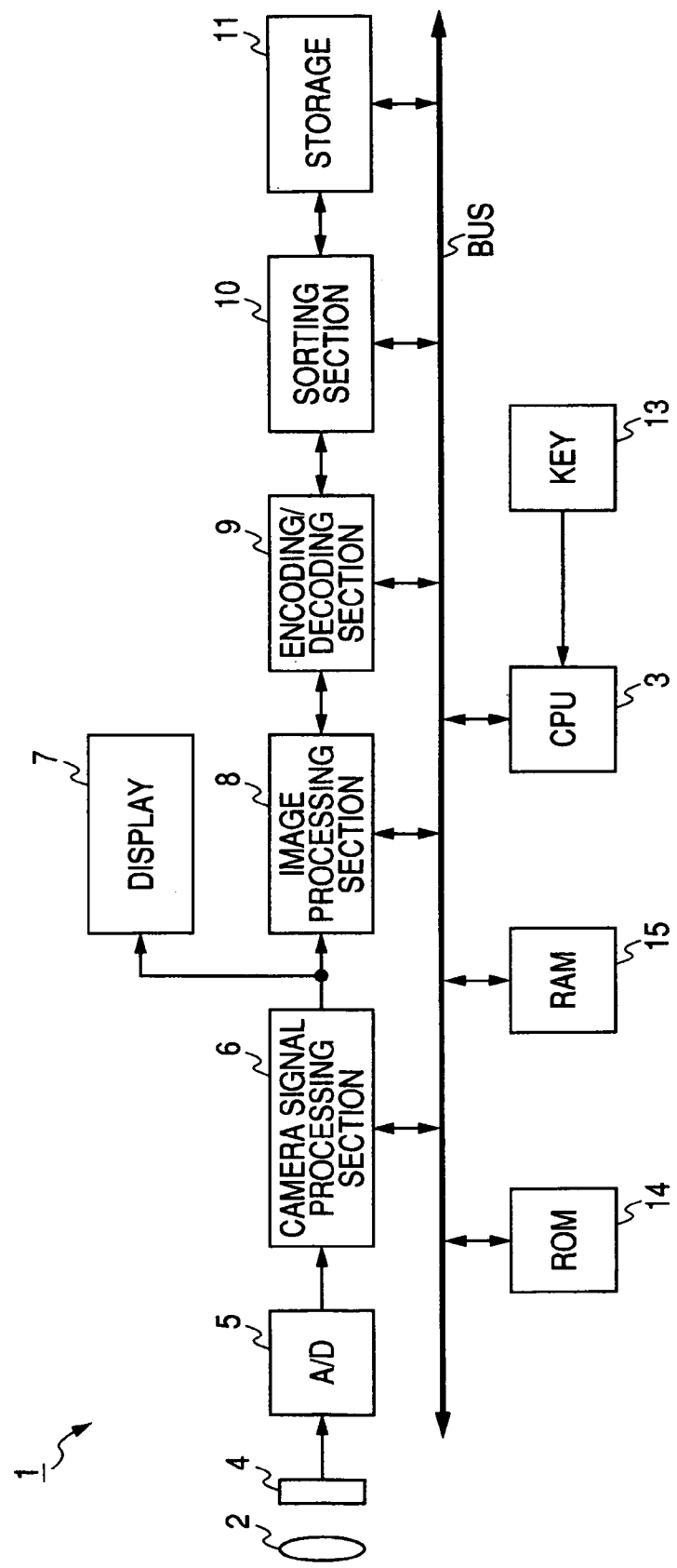
FIG. 2 is a block diagram showing a digital still camera according to an embodiment of the invention.

FIG. 2 is a block diagram showing a digital still camera according to an embodiment of the invention. The digital still camera 1 includes a lens 2 that gathers incident light by zooming and focusing and through an aperture under the control of a central processing unit 3 and forms an optical image of a subject on an imaging plane of a subsequent imaging element 4.

The imaging element 4 includes a Charge Coupled Device (CCD), for example, and outputs an imaging result based on an optical image formed on the imaging plane. An analog/digital converting section (A/D) 5 performs analog/digital converting processing on the imaging result output from the imaging element 4 and outputs image data.

A camera signal processing section 6 performs matrix computing processing, white-balance adjusting processing, gamma correcting processing, for example, on the image data output from the analog/digital converting section 5 under the control of the central processing unit 3 and outputs an imaging result based on the image data including intensity data and color-difference signal. A display 7 displays a monitor image of the imaging result by processing the image data output from the camera signal processing section 6.

An image processing section 8 outputs the image data output from the camera signal processing section 6 to an encoding/decoding section 9. The image processing section 8 further starts an operation under the control of the central processing unit 3 and image-processes and outputs the image data input from the camera signal processing section 6 and to be output to the encoding/decoding section 9. Thus, the imaging result obtained from the imaging element 4 is image-processed and output. Also under the control of the central processing unit 3, the image processing section 8 receives the input of image data from the encoding/decoding section 9 through a buffer memory, not shown, and image-processes the image data. The image processing section 8 further outputs the image data based on the image processing result to the encoding/decoding section 9 through the buffer memory, which is used upon input, and thus image-processes the imaging result recorded on a recording medium. The image processing herein may include resizing processing for scaling up or down an image by converting the resolution, image rotating processing for rotating an image and trimming processing for extracting a part of an image.

Under the control of the central processing unit 3, the encoding/decoding section 9 creates encoded data by performing encoding processing by JPEG, which is one of encoding methods based on variable-length encoding, on the image data input from the image processing section 8 through the buffer memory and outputs the created encoded data to a sorting section 10. Conversely, the encoding/decoding section 9 decodes encoded data input from the sorting section 10 and outputs the resulting image data to the image processing section 8 through the buffer memory. The encoding/decoding section 9 in these kinds of processing notifies the central processing unit 3 of an amount of created codes and a DC-value which is detected from a macro block, every macro block, which is an encoding processing unit. The encoding/decoding section 9 further performs encoding processing on the DC values of serial macro blocks in accordance with the specifications of JPEG to DC coefficients based on the difference values with reference to the DC value of the immediately preceding macro block and performs encoding processing on the DC coefficients by changing the reference DC value to the DC value instructed by the central processing unit 3.

The sorting section 10 has a memory and, by the address control under the control of the central processing unit 3, sorts and outputs the encoded data input from the encoding/decoding section 9 to a storage 11 and outputs the encoded data obtained from the storage 11 to the encoding/decoding section 9. In accordance with an instruction by the central processing unit 3, the sorting section 10 in the processing of sorting the encoded data rewrites a control code for decoding processing, which is position information for identifying a location of each macro block, such as a slice start code and a block code, in response to the sorting processing.

The storage 11 is a recording medium such as a memory card, an optical disk and a magnetic disk and records and holds encoded data output from the sorting section 10 and outputs the recorded and held encoded data to the sorting section 10.

Thus, the digital still camera 1 performs encoding processing by the encoding/decoding section 9 on the imaging result obtained by the imaging element 4 and records the result in the storage 11. In accordance with an instruction by a user in recording, the image processing by the image processing section 8 is followed by encoding processing and recording in the storage 11. The imaging result recorded in this way is read out from the storage 11 and is decoded by the encoding/decoding section 9, and the image data based on the decoding result is image-processed by the image processing section 8, then undergoes encoding processing and is recorded in the storage 11.

The central processing unit 3 is a control unit that controls an operation of the digital still camera 1 and controls operations of the components in accordance with an operation on a key 13 by executing a processing program recorded in a read-only memory (ROM) in a work area in a random access memory (RAM) 14. Thus, in this embodiment, the digital still camera 1 is provided with the processing program by previously installing it therein, but, instead of the pre-installing, the processing program may be recorded on a recording medium such as an optical disk, a magnetic disk and a memory card or may be provided by downloading over a network such as the Internet.

The series of processing allows the central processing unit 3 to control an operation of the camera signal processing section 6, for example, in accordance with an operation by a user. Thus, the imaging result based on a moving picture is captured by the imaging element 4 and is displayed on the display 7. An operation on a trigger switch by a user also controls the camera signal processing section 6 and thus obtains an imaging result based on a still image, instead of the imaging result based on a moving picture, records the imaging result in a memory, not shown, and displays it on the display 7. When a user instructs to save the imaging result under this condition, the image processing section 8, encoding/decoding section 9 and storage 11, for example, may be controlled, whereby the imaging result based on a still image, which is held in the memory, undergoes encoding processing and is recoded in the storage 11. When a user instructs the image processing in recoding imaging results, the imaging results held in the memory are sequentially and partially extracted and image-processed in image processing units and in an order suitable for the processing in the image processing section 8. Furthermore, the image processing results sequentially undergo encoding processing, and the resulting encoded data pieces for one picture plane are collectively sorted by the sorting section 10 and are recorded in the storage 11 in an order for encoding processing.

On the other hand, when a user instructs to edit an imaging result recoded in the storage 11 in this way, the imaging result recorded in the storage 11 is decoded by the encoding/decoding section 9 and is image-processed by the image processing section 8. Then, the processing result undergoes encoding processing by the encoding/decoding section 9 and is recorded in the storage 11. Here, the central processing unit 3 repeats decoding processing, image processing and encoding processing on imaging results in an image processing unit suitable for the processing in the image processing section 8, which are recorded in the storage 11, in the processing order in the image processing section 8. Then, the encoded data pieces resulting from the repeated processing for one picture plane are collectively sorted by the sorting section 10 into the order for encoding processing and are recorded in the storage 11.

Figure 1:
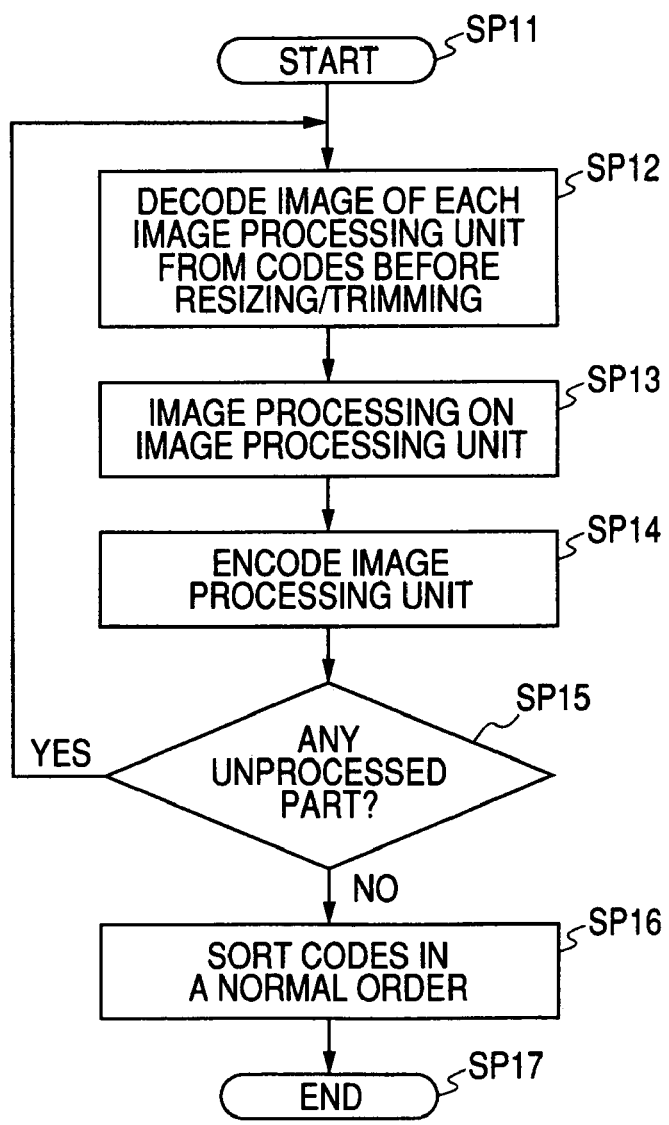
FIG. 1 is a flowchart showing processing steps by a central processing unit in a digital still camera according to an embodiment of the invention.

FIG. 1 is a flowchart showing processing steps of the central processing unit 3, which relates to the image processing on imaging results recorded in the storage 11. The central processing unit 3 starts the processing steps in accordance with an operation by a user in step SP11. Then, the processing moves to step SP12 where the storage 11 and the encoding/decoding section 9 are controlled to decode the imaging results, which are recorded in a recording medium, in an image processing unit.

Figure 3:
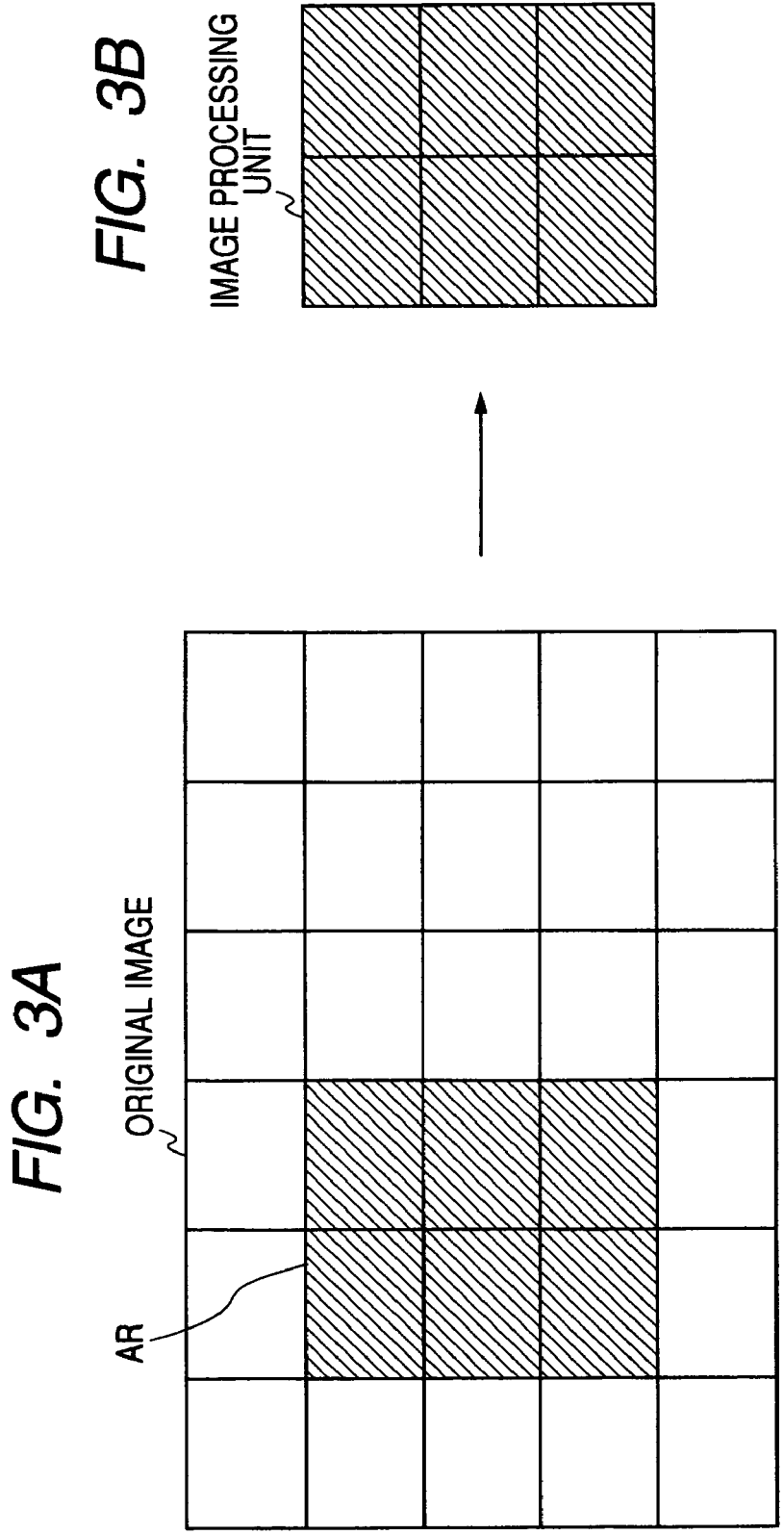
FIGS. 3A and 3B are schematic diagrams for describing decoding processing on an image processing unit in the digital still camera in FIG. 2.

The decoding processing in image processing units here is performed by decoding image data pieces by sequentially processing encoded data pieces in macro blocks, which are recorded in the storage 11, by the encoding/decoding section 9, as shown in FIGS. 3A and 3B and selectively outputting the image data piece of an area AR instructed by the central processing unit 3 from the decoded image data pieces. Thus, the central processing unit 3 sequentially designates the selectively output area AR in the order of image processing and instructs the encoding/decoding section 9 to perform decoding the image processing units.

In the next step SP13, the central processing unit 3 instructs the image processing section 8 to perform image processing on the image data and records the processing result in the buffer memory. In the next step SP14, the central processing unit 3 instructs the encoding/decoding section 9 to perform encoding processing on the image data recorded in the buffer memory and records the resulting encoded data in the memory of the sorting section 10.

Then, the central processing unit 3 in step SP15 determines whether any unprocessed part remains or not. If the determination result is affirmative, the processing returns to step SP12. Thus, in this case, the central processing unit 3 repeats the processing steps of SP12-SP13-SP14-SP15-SP12 on each image processing unit in the order of processing in the image processing section 8. When the processing on all of the image processing units completes, and the encoded data pieces for one picture plane are stored in the memory of the sorting section 10, and if the determination result in step SP15 is denial, the processing moves to step SP16.

Here, the central processing unit 3 controls the sorting section 10 to sort the encoded data pieces for one picture plane held in the sorting section 10 into the order of encoding processing on all of the data pieces for one picture plane and records the result in the storage 11.

Figure 4:
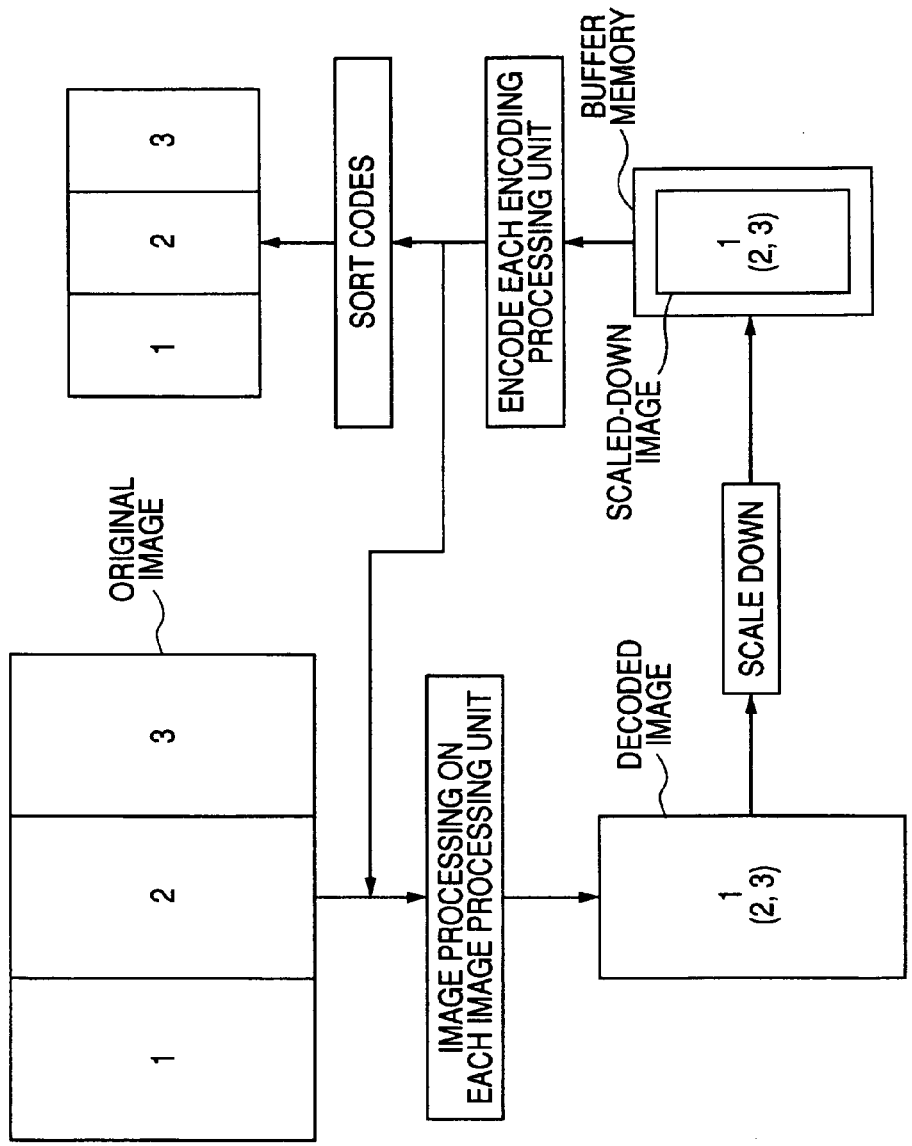
FIG. 4 is a schematic diagram for describing image processing in the digital still camera in FIG. 2.
Figure 17:
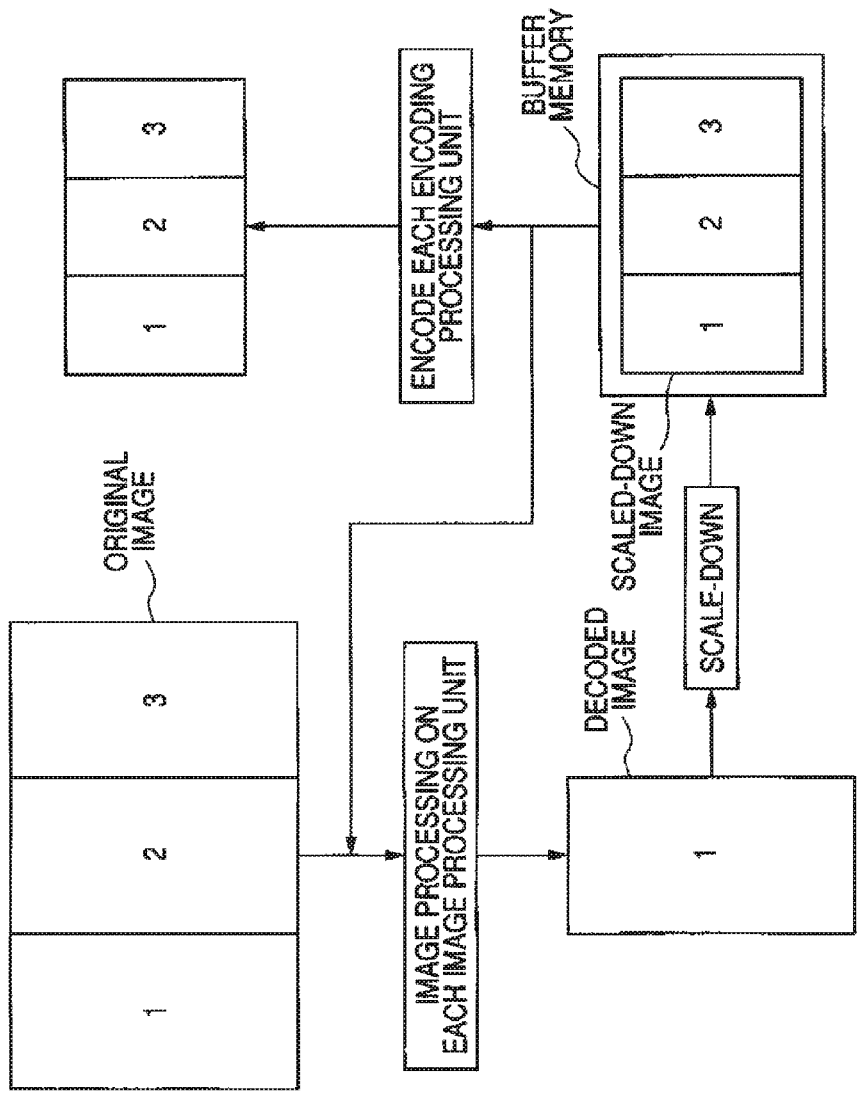
FIG. 17 is a schematic diagram for describing the processing in FIG. 16.

Thus, as in FIG. 4 showing a case that an image is scaled down by resizing in comparison with the case in FIG. 17, the decoding, resizing (scaling-down) and encoding processing is repeated on each image processing unit including partial images 1, 2 and 3. When the processing on the data pieces for one picture plane, the encoded data pieces are sorted and recorded.

The central processing unit 3 thus controls the entire operations to repeat the series of processing when scaling-up or -down is instructed by a user. When a user instructs to perform the processing of trimming for extracting an image, the central processing unit 3 controls the entire operations to perform the series of processing on the area instructed by the user only.

Figure 5:
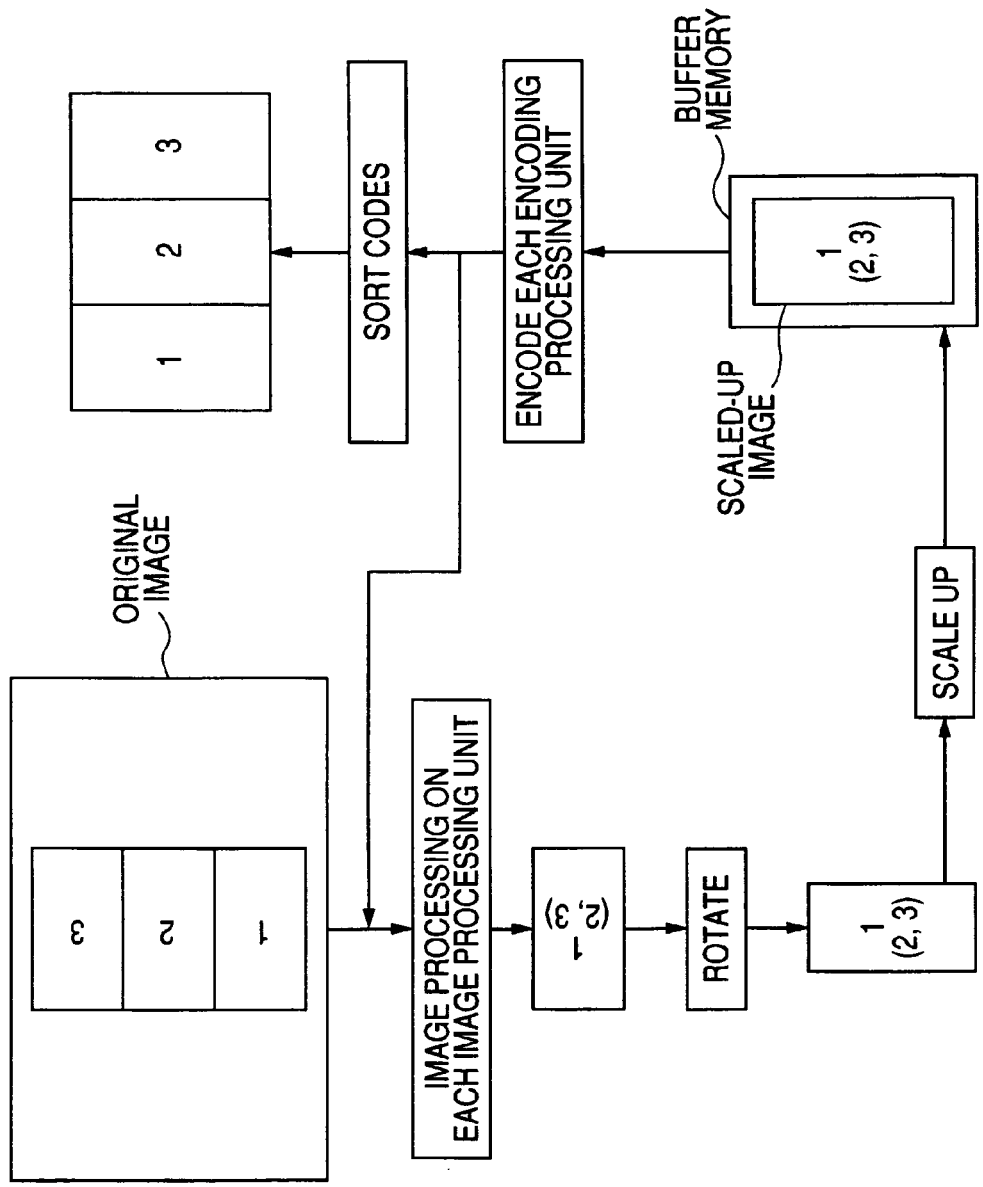
FIG. 5 is a schematic diagram for describing image processing by image rotation in the digital still camera in FIG. 2.
Figure 6:
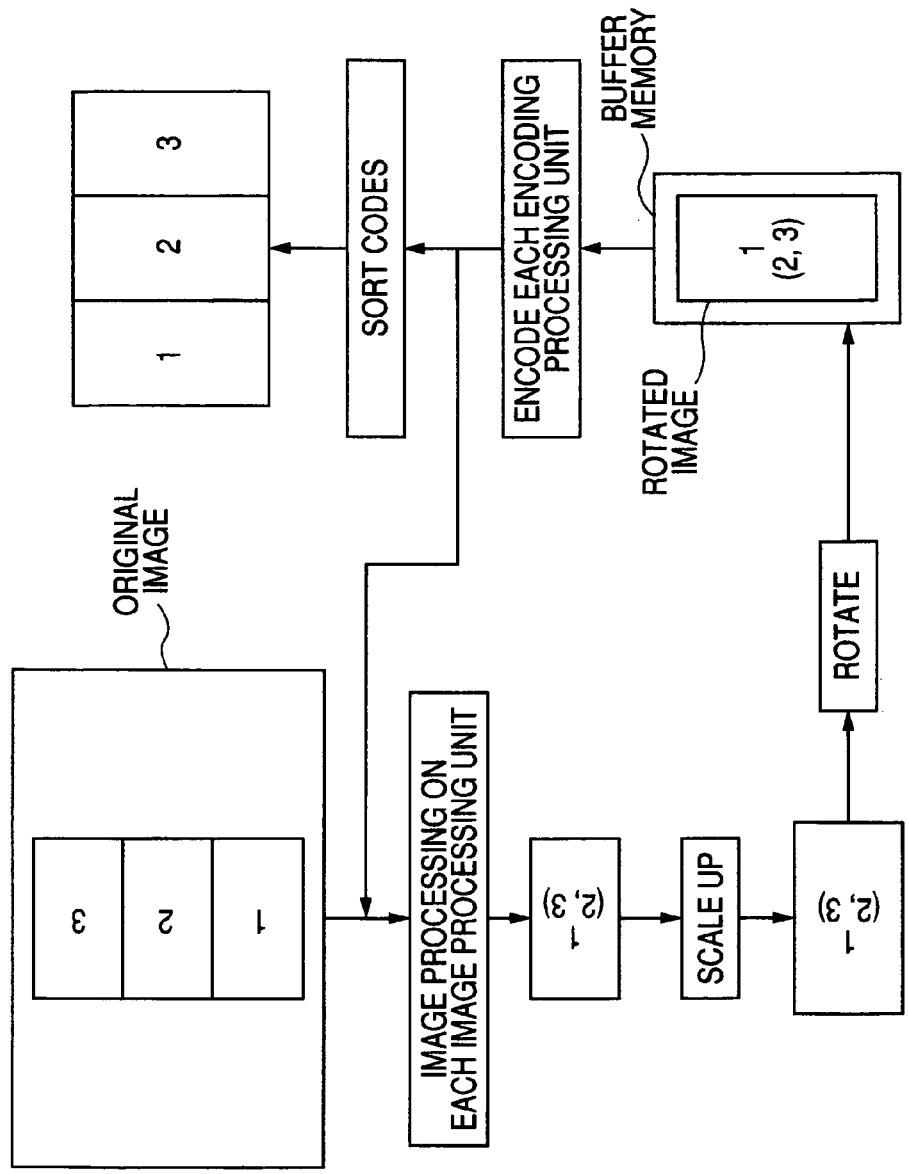
FIG. 6 is a schematic diagram for describing image processing in an example, which is different from that in FIG. 5.

In order to rotate and scale up an imaging result by image processing in comparison with that in FIG. 4, the process of decoding, rotating, resizing (scaling-up) and encoding processing is repeated on each image processing unit including partial images 1, 2 and 3 as shown in FIG. 5. When the processing on data for one picture plane completes, the encoded data pieces are sorted and recorded. In this case, as shown in FIG. 6 in comparison with FIG. 5, the rotating and resizing processing may be interchanged.

The central processing unit 3 in these kinds of processing defines the size of an image processing unit for decoding such that the image processing unit including image data pieces input to the encoding/decoding section 9 in encoding can be equivalent to one or multiple macro blocks, each of which is an encoding processing unit. Thus, unnecessary processing steps may be reduced. In the image processing, the processing of converting the resolution, for example, may be implemented by vertical and horizontal filtering processing. In this case, the central processing unit 3 defines an image processing unit before instructing the series of processing such that overlapped areas can be formed between adjacent processing units in order to prevent the block distortion in the filtering processing. In this case, the number of overlapped areas are equal to the number of samples, which is half the number of taps subject to the filtering processing.

Thus, the image processing unit of image data to be input to the image processing section 8 is equal to the area including 2 n macro blocks each horizontally and vertically in addition to image data for four samplings horizontally and vertically. In this case, the image processing unit in encoding processing is a total of four macro blocks including two macro blocks each horizontally and vertically, for example. Furthermore, the image processing is scaling-down processing for reducing the horizontal and vertical resolutions by 1/n times by filtering processing where the number of horizontal and vertical taps is eight.

The image processing unit of image data to be input to the encoding/decoding section 9 does not have to be defined to the size of the image processing unit for decoding, which is equal to that of one or multiple macro blocks. When the image processing unit of the image data to be input to the encoding/decoding section 9 is different from that of one or multiple macro blocks, a redundant part from one or multiple macro blocks may be included in the adjacent image processing unit, and encoded data resulting from the encoding processing on the adjacent image processing unit may be adopted.

Thus, in this embodiment, the capacity of the buffer memory that temporarily holds image processing results can be reduced by sorting and recording encoded data pieces for one picture plane after repeating the decoding processing, image processing and encoding processing both in image processing units and the order for the image processing.

Though, in some image processing in the image processing section 8, the size of the image processing unit of image data to be input to the image processing section 8 may be different from the size of the image processing unit of the image data to be output from the image processing section 8, the sizes of these image processing units are handled as being equal for simple description below. Each macro block is shown as an image processing unit by enclosing a thick line.

Figure 7A:
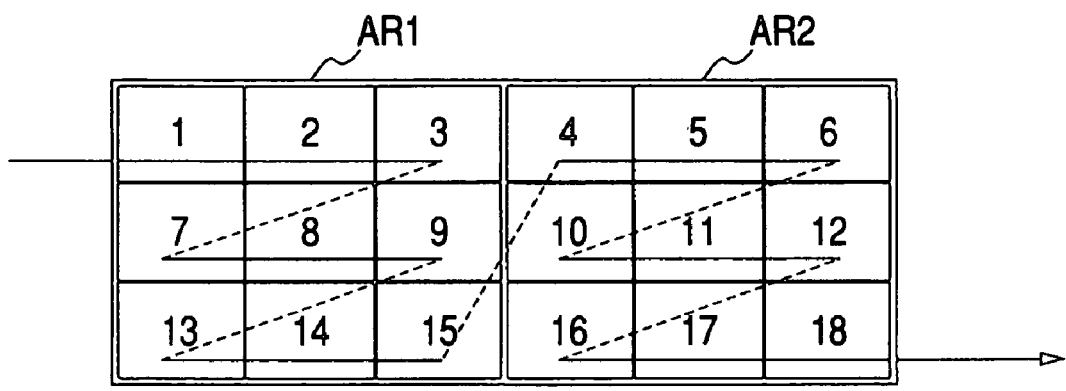
FIGS. 7A and 7B are schematic diagrams for describing processing of sorting encoded data pieces.

FIG. 7A is a plane view for describing encoding processing in image processing units and in the order of image processing. In this case, after a first image processing unit AR1 including nine macro blocks 1 to 3, 7 to 9 and 13 to 15 is created by image processing, a second image processing unit AR2 including remaining macro blocks 4 to 6, 10 to 12 and 16 to 18 is created by image processing. In this case, the encoding processing is sequentially performed on the first image processing unit AR1 and second image processing unit AR2. Thus, the encoded data is created by performing the encoding processing on each of the macro blocks of the image processing units AR1 and AR2 in the order of raster scanning as indicated by the arrows.

Figure 7B:
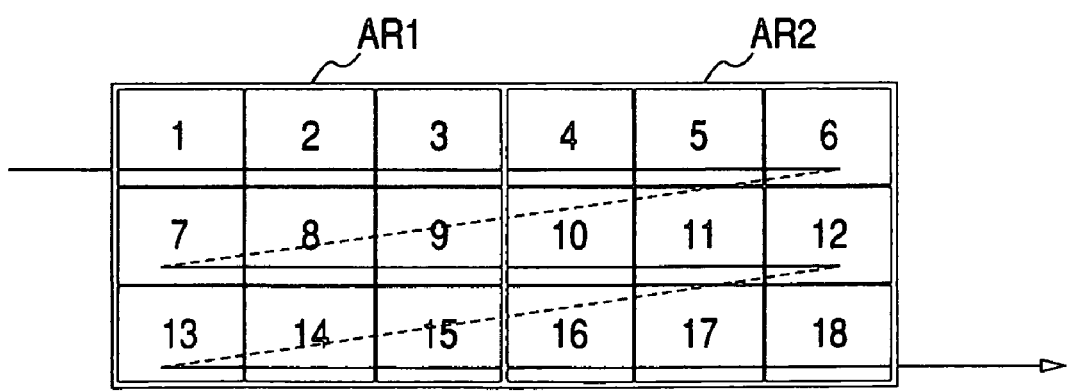

On the other hand, as shown in FIG. 7B in comparison with FIG. 7A, when encoding processing is performed on one image having the image processing units AR1 and AR2, the encoded data is created in an order for raster-scanning the macro blocks of the one image in accordance with the order indicated by the reference numerals of the macro blocks.

Thus, in this case in this embodiment, the encoded data pieces obtained in the order shown in FIG. 7A are sorted and output by the sorting section 10 in the order shown in FIG. 7B. Here, the encoding processing by JPEG creates a DC coefficient by pre-holding the DC value of the immediately preceding macro block and performing encoding processing on a DC value of the subsequent macro block based on the difference value from the pre-held DC value. Thus, in the example shown in FIG. 7A, the DC values of the macro blocks 7 and 13 are encoded by the difference values from the DC values of the macro blocks 3 and 9, respectively. Similarly, the DC values of the macro blocks 4, 10 and 16 are encoded by the difference values from the DC values of the macro blocks 15, 6 and 12.

On the other hand, when encoding processing is performed on one image having the image processing units AR1 and AR2, the DC values of the macro blocks 7 and 13 are encoded by the difference values from the DC values of the macro blocks 6 and 12 at the right end, which is the finishing end of the horizontal scanning. The DC values of the macro blocks 4, 10 and 16 at the beginning end of horizontal scanning in the second image processing unit AR2 are encoded by the difference values from the DC values of the macro blocks 3, 9 and 15 at the finishing end of the horizontal scanning in the first image processing unit AR1.

Thus, in this case, the accurate decoding is difficult only by sorting, in the order of collective encoding processing for one picture plane, the encoded data pieces in macro blocks obtained simply in the order of image processing and defining control codes again.

Thus, in this case, in performing encoding processing on macro blocks in an image processing unit and in the order of raster scanning, the central processing unit 3 obtains and records the DC values detected by the encoding/decoding section 9 of the macro blocks at the end of the horizontal scanning in the raster scanning. Then, before the encoding processing on the adjacent macro block, the central processing unit 3 sets the recorded DC value, instead of the pre-held DC value, to the encoding/decoding section 9 and instructs the encoding processing. The adjacent macro block refers to the adjacent macro block after the sorting by the sorting section 10.

Figure 8:
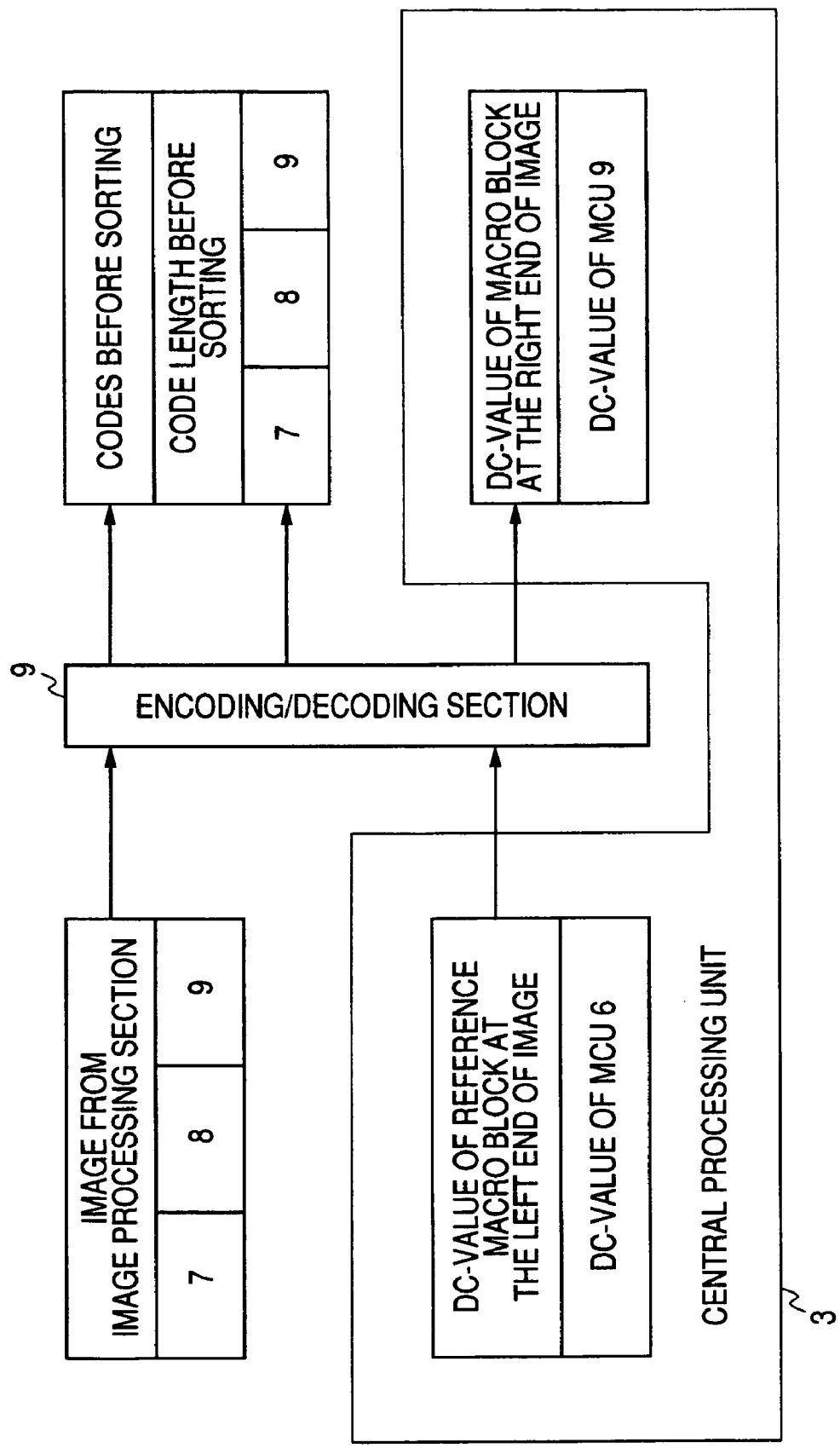
FIG. 8 is a schematic diagram for describing processing on DC-values.

Thus, the central processing unit 3 in the example in FIGS. 7A and 7B records and holds the DC values detected by the encoding/decoding section 9 in the encoding processing on the macro blocks 3, 9 and 15 at the respective finishing ends of the horizontal scanning in the encoding processing on the first image processing unit AR1 including the macro blocks 1 to 3, 7 to 9 and 13 to 15. Then, in order to perform encoding processing on the subsequent second image processing unit AR2, the central processing unit 3 sets the DC values of the recorded and held macro blocks 3, 9 and 15 to the encoding/decoding section 9, and encoding processing is performed on the macro blocks 4, 10 and 16 at the beginning ends of the horizontal scanning. FIG. 8 schematically shows the series of processing on the macro blocks 7, 8 and 9.

Thus, as shown in FIGS. 9A to 9C in comparison with FIG. 8, encoded data of one picture plane is created (see FIG. 9C) from the macro blocks 7 to 12 by connecting, in code length of each macro block, the encoded data pieces (see FIG. 9A) of the macro blocks 7, 8 and 9 and the encoded data pieces (see FIG. 9B) of the macro blocks 10, 11 and 12.

As described later, the image processing in the digital still camera 1 includes processing of rotating a decoded image by 180 degrees. Thus, the macro block the DC value of which is to be recorded and held is not only a macro block at the finishing end of horizontal scanning but also a macro block at the beginning end of horizontal scanning. In the processing, the central processing unit 3 controls the operation of the encoding/decoding section 9 so as not to define a delimiter code in image processing units and not to insert a staffing bit.

By the way, the DC values of the macro blocks 6 and 12, which are the encoding references of DC values of the macro blocks 7 and 13 at the beginning end of the horizontal scanning, excluding the macro block 1 at the beginning of scanning in the example in FIGS. 7A and 7B, may not be obtained before encoding processing even by performing encoding processing in image processing units sequentially and recording DC values. Thus, the central processing unit 3 performs encoding processing in image processing units sequentially and records the DC values and detects and holds the DC values of the macro blocks the DC values of which may not be prepared, through further previous decoding processing, image processing and encoding processing.

In other words, before starting the processing in image processing units, the central processing unit 3 controls the operations of the components to perform decoding processing, image processing and encoding processing on the macro blocks 6, 12 and 18 at the right end shown in FIGS. 7A and 7B and detects and holds the DC values of the macro blocks 6, 12 and 18 in the encoding processing of the series of processing. Notably, in this case, the previous encoding processing is processing only for detecting the DC value, and the encoded data piece obtained by the encoding processing is not used but is abandoned.

Figures 10A, 10B, 10C, 10D:
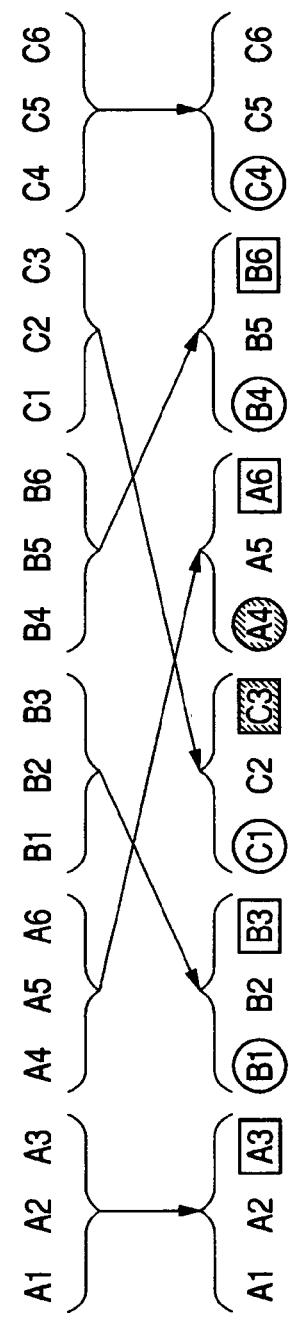
FIGS. 10A to 10D are schematic diagrams for describing processing of sorting encoded data pieces in another example.

Thus, as shown in FIG. 10A, in order to perform image processing on three image processing units including macro blocks A1 to A6, B1 to B6 and C1 to C6, the central processing unit 3 creates the image data pieces of the image processing units by decoding encoded data pieces recorded in the storage 11 sequentially in the order of the raster scanning as indicated by the arrows, then performs image processing and encoding processing on the image data pieces and thus creates encoded data pieces of the macro blocks A1 to A6, B1 to B6 and C1 to C6 sequentially in the order of image processing as shown in FIG. 10B.

As shown in FIG. 10C including the arrow indicating the sorting in comparison with FIG. 10B, the encoded data pieces are sorted by the sorting section 10 and are recorded in the storage 11 in the order of collective encoding processing on data for one picture plane including the macro blocks A1 to A6, B1 to B6 and C1 to C6 as shown in FIG. 10D. The operation of the encoding/decoding section 9 is controlled to detect and hold the DC values of the macro blocks A3, B3, A6 and B6 and so on in boxes in FIG. 10C in encoding processing and to perform encoding processing on the adjacent macro blocks in the encoded data output from the sorting section 10, which are macro blocks B1, C1, A4 and B4 in circles with reference to the recorded and held DC values.

The encoding processing in such serial image processing units includes obtaining and holding, by the previous processing, DC value only of the macro block C3 the DC value of which may not be prepared. The DC value obtained by the previous processing is set to the encoding/decoding section 9 to perform encoding processing on the corresponding macro block A4.

Figure 11:
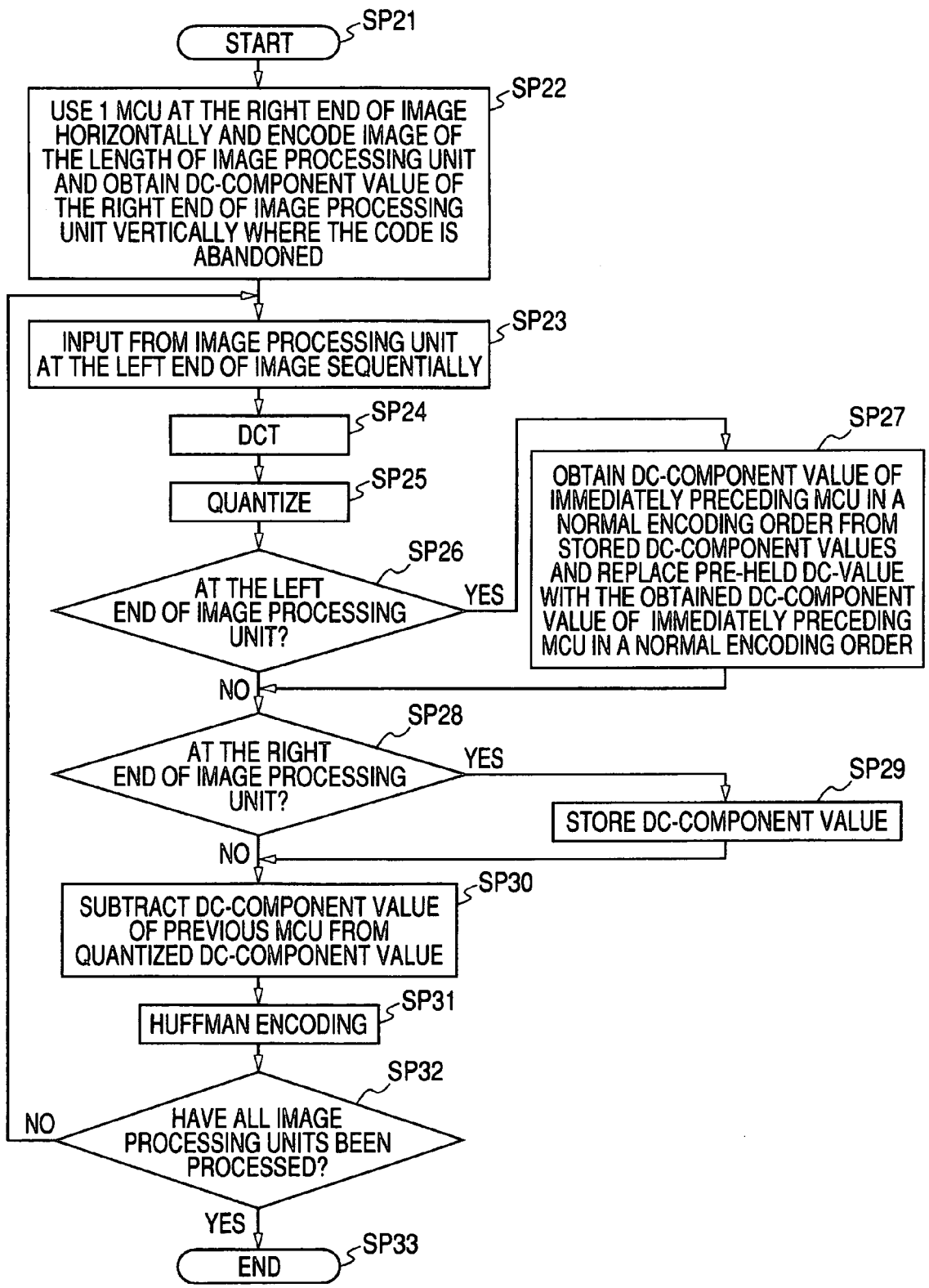
FIG. 11 is a flowchart showing processing steps by a central processing unit, which relates to the processing of sorting encoded data pieces.

FIG. 11 is a flowchart showing processing steps in the central processing unit 3, which relates to the processing on DC values. The central processing unit 3 starts the processing in step SP21 and moves to step SP22 where, by controlling the storage 11 and the encoding/decoding section 9, encoded data piece of a macro block (MCU) the DC value of which may not be detected by the repeated encoding processing in image processing units is decoded, and the image data is created. Then, the image data is image-processed by the image processing section 8. The encoding/decoding section 9 performs encoding processing on the image data resulting from the processing and previously detects the DC value of a macro block the DC value of which may not be prepared by the repeated encoding processing in image processing units. For easy understanding, the description on the processing shown in FIG. 11 illustrates a case with the definition for each image processing unit shown in FIGS. 7A and 7B and FIGS. 10A to 10D.

Next, the central processing unit 3 sequentially performs decoding processing and image processing in image processing units and stores the image data pieces in the buffer memory. In the subsequent processing step SP23, the central processing unit 3 inputs the image data piece of one macro block in the order of raster scanning from the buffer memory storing the image processing results to the encoding/decoding section 9. The central processing unit 3 performs a discrete cosine transform (DCT) thereon in the next step SP24, and performs quantization processing on the coefficient data resulting from the discrete cosine transform in the next step SP25. In the next step SP26, the central processing unit 3 determines whether a macro block in processing is at the beginning end of the horizontal scanning of an image processing unit or not. If the determination result is affirmative, the processing moves from step SP26 to step SP27 where the pre-held DC value, which is a calculation reference of the DC difference value in the processing in step SP30, is replaced by the recorded and held DC value. Then, the processing moves to step SP28. On the other hand, the determination result in step SP26 is denial, the processing directly moves from step SP26 to step SP28.

In step SP28, the central processing unit 3 determines whether the macro block in processing is at the finishing end of the horizontal scanning of an image processing unit or not. If the determination result is affirmative, the processing moves to step SP29 where the DC value detected in step SP25 is recorded, and the processing moves to step SP30. If the determination result in step SP28 is denial, the processing directly moves from step SP28 to step SP30.

In step SP30, the central processing unit 3 creates coefficient data relating to the DC value based on the difference value between the DC value detected in step SP25 and the pre-held DC value or DC value set in the encoding/decoding section 9. In the next step SP31, Huffman encoding is performed on the coefficient data calculated in step SP30 and the coefficient data relating to the AC value resulting from the quantization in step SP25. In the next step SP32, the central processing unit 3 determines whether the processing on all of the macro blocks have completed or not. If the determination result is denial, the processing return from step SP32 to step SP23. If the determination result in step SP32 is affirmative, the processing moves from step SP32 to step SP33 where the processing ends.

Figure 12:
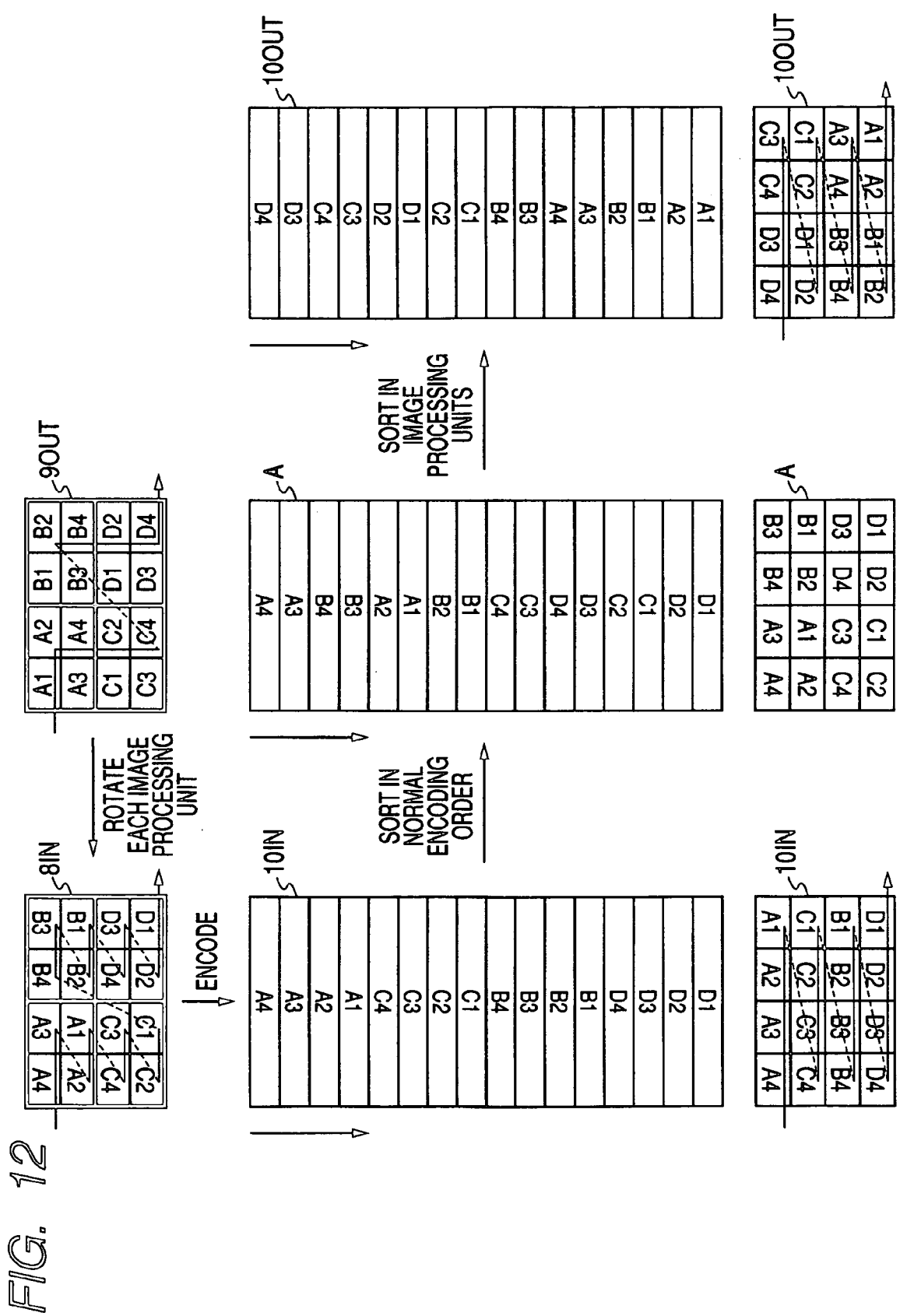
FIG. 12 is a schematic diagram for describing processing for rotating an image in an image processing unit.

On the other hand, FIG. 12 shows a schematic diagram showing a series of processing of rotating an image by 180 degrees by image processing. As indicated by the sign "9OUT", images to be processed are expressed by four image processing units of macro blocks A1 to A4, B1 to B4, C1 to C4 and D1 to D4. In this case, the central processing unit 3 controls the entire operations so as to rotate by 180 degrees, perform image processing and encoding processing, sort and output images of image processing units.

In other words, the central processing unit 3 creates image data by decoding encoded data pieces in the order of image processing units of the macro blocks A1 to A4, image processing units of the macro blocks C1 to C4, image processing units of the macro blocks B1 to B4 and image processing units of macro blocks D1 to D4 as indicated by the arrows. The central processing unit 3 temporarily stores the image data pieces resulting from the decoding, which are output from the encoding/decoding section 9, in the buffer memory in the order and rotates by 180 degrees and inputs the images of image processing units to the image processing section 8 as indicted by the sign "8IN" in FIG. 12 by address control on the buffer memory. Notably, in this case, the images of image processing units may be rotated by address control in recording and outputting image processing results output from the image processing section 8 into the buffer memory. FIG. 12 has reference numerals given to macro blocks, which are rotated by 180 degrees, for illustrating the rotation by 180 degrees of the original image.

After the central processing unit 3 image-processes the image data pieces of the image processing units by 180 degrees, the encoding/decoding section 9 performs encoding processing on the resulting image data pieces. Thus, encoded data pieces are created in the order indicated by the sign "10IN". Thus, in this case, the encoded data pieces are created in the order of raster scanning on the macro blocks of the image processing units.

The central processing unit 3 causes the subsequent sorting section 10 to sort and output the encoded data pieces by the encoding/decoding section 9 such that the encoded data pieces are aligned continuously in the order of raster scanning on the image resulting from the rotation of the original image by 180 degrees as indicated by the sign "10OUT".

Also in the processing, the central processing unit 3 records and holds the DC values in the encoding processing on the serial image processing units and sets the recorded and held DC values in the encoding/decoding section 9 in the encoding processing on image processing units to be performed later. Thus, the encoded data pieces can be decoded more accurately.

Furthermore, in the encoding processing in the serial image processing units, only the DC value of the macro block is obtained and held in the previous processing when the DC value may not be prepared, and encoding processing is performed on the corresponding macro block by setting the DC value obtained by the previous processing in the encoding/decoding section 9. Though, in the example shown in FIG. 12, the DC-values of the macro blocks D2, B4, B2, C4, C2, A4 and A2 may be required to set, the DC values of the processing reference macro blocks C3, C1 and A3 may be prepared for the macro blocks B2, B4 and D2 among them in the encoding processing on the serial image processing units. However, the DC-values of the processing references may not be prepared in the encoding processing on the serial image processing units for the macro blocks A2, A4, C2 and C4. Accordingly, in this case, the central processing unit 3 only obtains and holds, by the previous processing, the DC-values of the macro blocks B1, B3, D1 and D3 at the beginning end of the scanning adjacent to the macro blocks A2, A4, C2 and C4. Then, the central processing unit 3 sets the DC values in the encoding/decoding section 9 before performing encoding processing on the macro blocks A2, A4, C2 and C4.

In this case, as indicated by the sign "A", the address control in the sorting section 10 may be simplified by sorting the encoded data pieces of image processing units and then sorting the image processing units.

Figure 13:
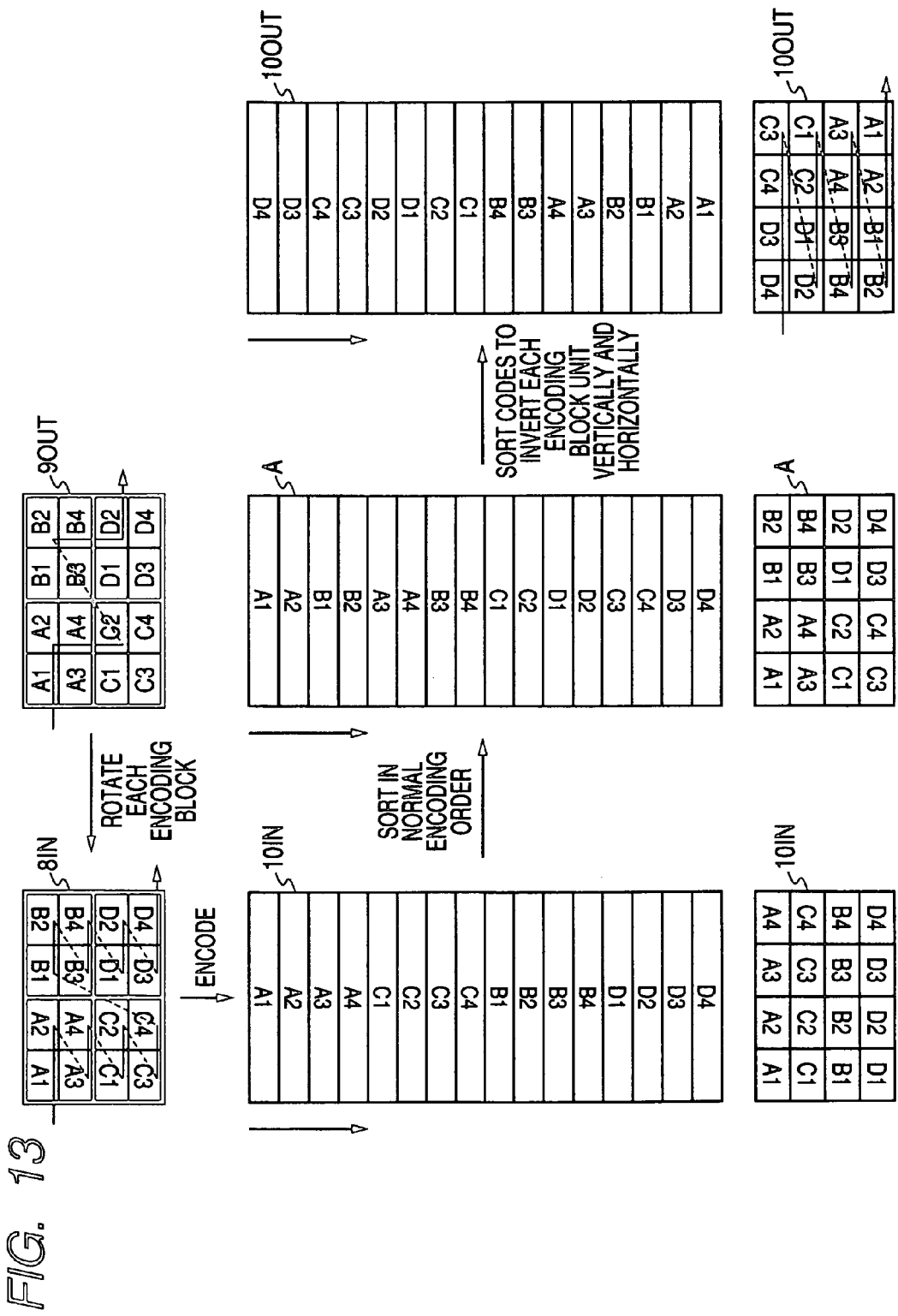
FIG. 13 is a schematic diagram for describing processing for rotating an image in an encoding processing unit.

Instead of the sorting processing after rotating and performing image processing and encoding processing on images of the image processing units, images of macro blocks may be rotated, undergo image processing and encoding processing and be sorted as shown in FIG. 13 in comparison with FIG. 12.

In other words, in this case, the central processing unit 3 decodes the image processing units in the order of raster scanning and stores the image data in the buffer memory. Then, the central processing unit 3 rotates the images of the macro blocks by 180 degrees by address control of the buffer memory and inputs the image data pieces to the image processing section 8. The encoding processing is performed on the output data pieces of the image processing section 8 sequentially by the encoding/decoding section 9. Also in this case, the images of the macro blocks may be rotated by address control in recording in the buffer and outputting the image processing results output from the image processing section 8. The encoded data pieces sequentially obtained in this way may be recorded and held and be sorted and output by the sorting section 10.

Even in this case, the central processing unit 3 records and holds the DC value of a macro block by the precious processing and performs encoding processing on serial image processing units after setting the DC value in the encoding/decoding section 9.

In this case, the direction of horizontal scanning on the horizontally adjacent macro blocks of one image processing unit may be inverted by the rotation upon encoding and upon output from the sorting section 10. Thus, in this case, the central processing unit 3 obtains and holds the DC values of adjacent macro blocks by the previous processing and performs encoding processing on the adjacent macro blocks with the held DC values in order to address the inversion of the direction of scanning.

Figure 14:
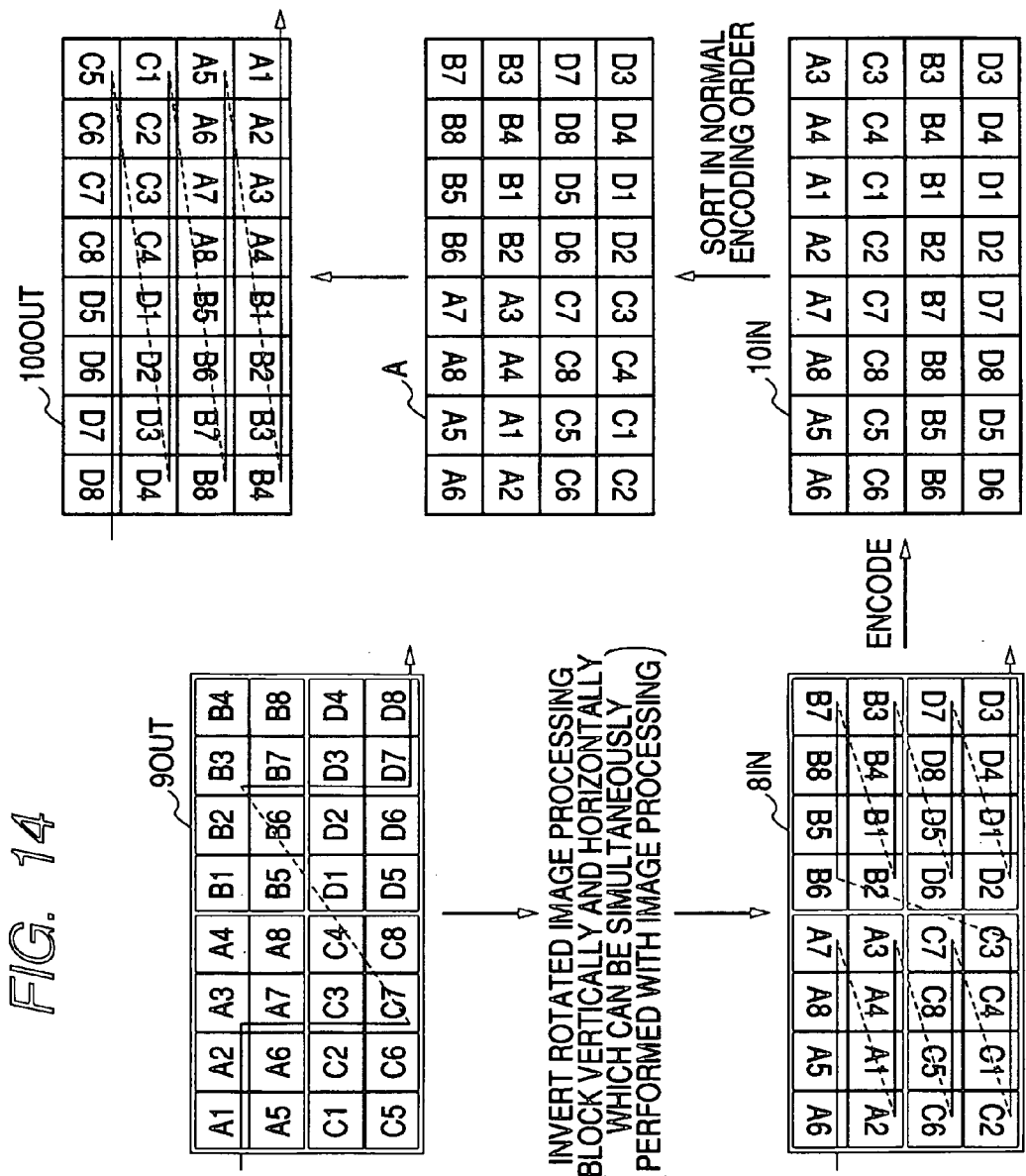
FIG. 14 is a schematic diagram for describing processing for rotating an image in a medium processing unit between the image processing unit and the encoding processing unit.

Instead of the performance of the image processing, encoding processing and sorting processing after the rotation of images of image processing units or macro blocks by 180 degrees, the image processing, encoding processing and sorting processing may be performed after the rotation of images in meddle units between the image processing units and macro blocks by 180 degrees, as shown in FIG. 14 in comparison with FIGS. 12 and 13.

In other words, in the example in FIG. 14, image processing units are formed by macro blocks A1 to A8, B1 to B8, C1 to C8 and D1 to D8, and image processing is performed on the image processing units in the order of raster scanning as indicated by the arrows. The central processing unit 3 here rotates by 180 degrees and inputs the images of areas resulting from the horizontal division of image each image processing unit to the image processing section 8 by address control of the buffer memory that records and outputs image data pieces based on decoding results. Thus, the image data decoded after the rotation of the area of the macro blocks A1, A2, A5 and A6 and macro blocks A3, A4, A7 and A8 of the image processing unit of the macro blocks A1 to A8 are rotated by 180 degrees is input to the image processing section 8.

The image data pieces rotated by 180 degrees of the areas are image-processed and sequentially undergo encoding processing. Then, the resulting encoded data pieces are sorted and output by the sorting section 10. Here, the DC-values of the macro blocks on the beginning side of the horizontal scanning on the encoded data pieces output by the sorting section 10 of the encoded data pieces of the macro blocks, which are output by the sorting section 10 in this way, in the area subject to the rotation by 180 degrees may not be encoded accurately by the simple encoding processing on serial macro blocks. More specifically, the DC-values of the macro blocks D4, B8, B4, D6, D2, B6, B2, C8, C4, A8, A4, C6, C2, A6 and A2 may not be accurately encoded. Thus, in this case, the central processing unit 3 detects and records the DC values of the macro blocks D4, B8 and B4 in the encoding processing on serial image processing units and performs the encoding processing after setting the recorded DC values in the encoding/decoding section 9. The central processing unit 3 detects the DC values of the remaining macro blocks D6, D2, B6, B2, C8, C4, A8, A4, C6, C2, A6 and A2 by previous processing and performs the encoding processing with the detected DC-values.

Figure 15:
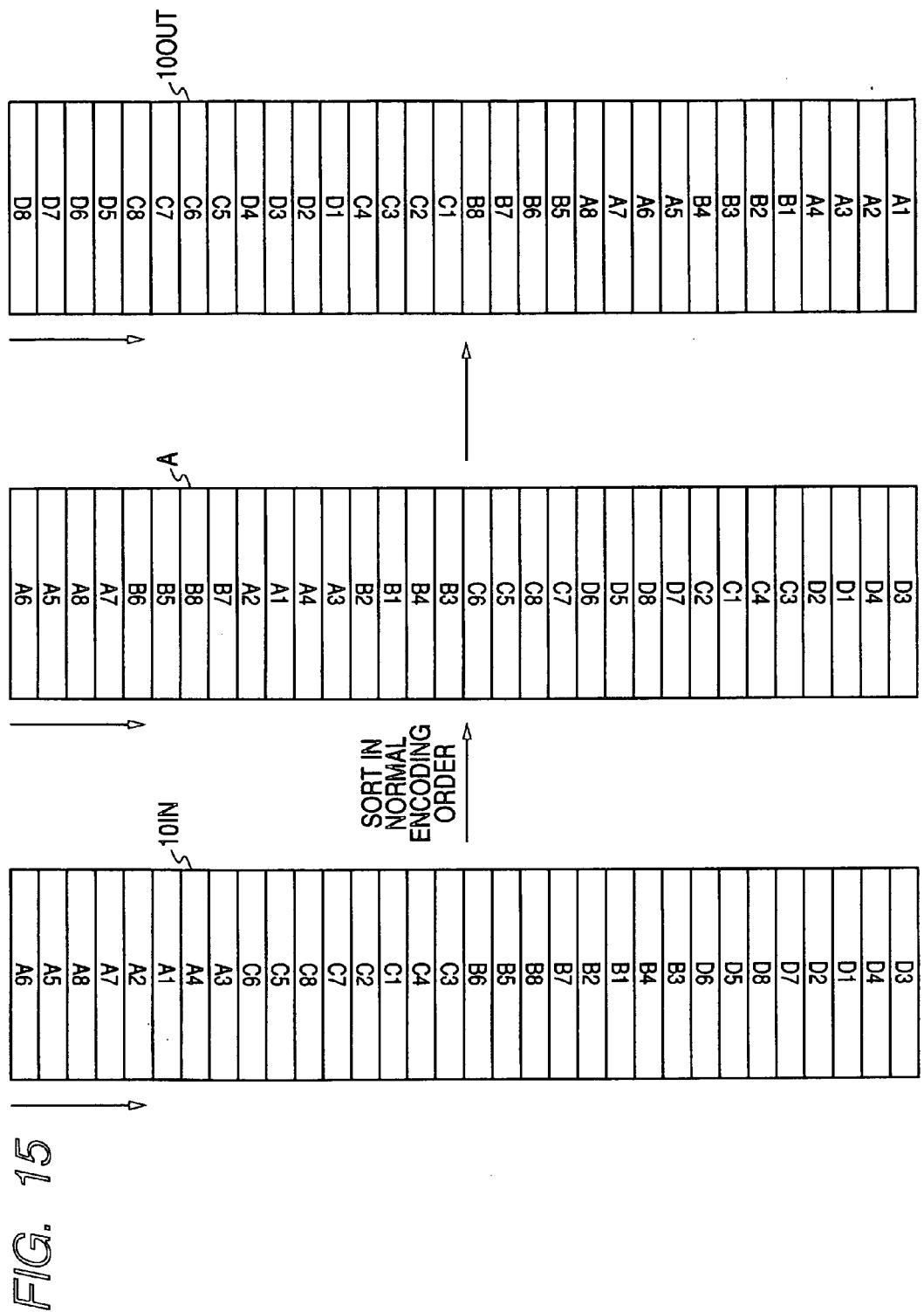
FIG. 15 is a diagram showing the alignment of macro blocks in the processing in FIG. 14.
Figure 16:
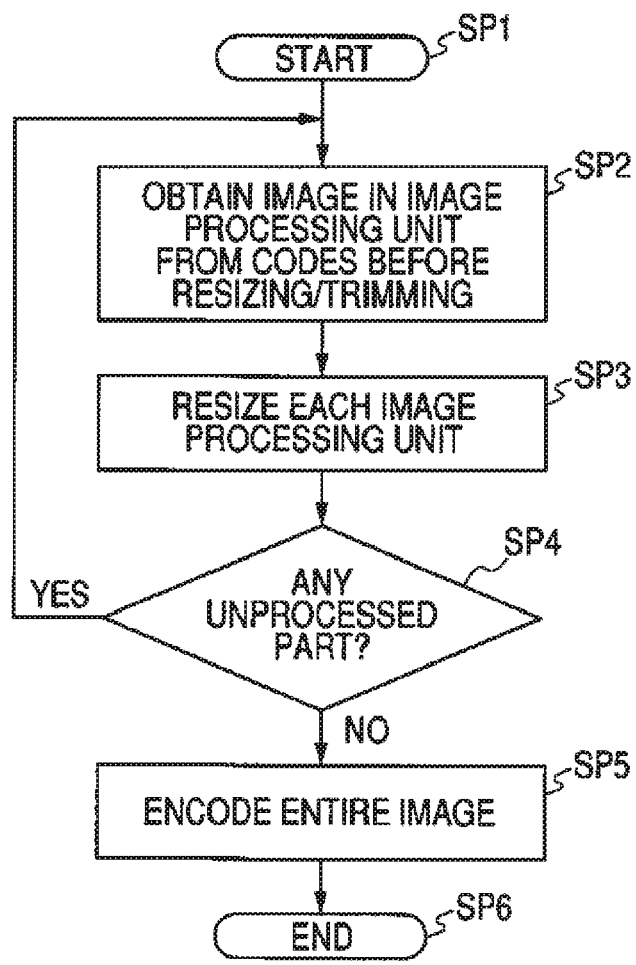
FIG. 16 is a flowchart for describing image processing in the past.

FIG. 15 shows the order of encoded data pieces in the parts in FIG. 14. Also in this case, as indicated by the sign A, the encoded data pieces may be sorted in image processing units and may then be sorted in the right order.

[2] Operations of Embodiment

In the digital still camera 1 (FIG. 1) in the construction above, an imaging result based on a still image is captured by the imaging element 4 in accordance with an operation by a user, and the imaging result is processed by the camera signal processing section 6. Then, the result undergoes encoding processing by JPEG by the encoding/decoding section 9 and is recorded in the storage 11. Thus, a desired imaging result is recorded in the storage 11. When the image processing on the imaging result recorded in the storage 11 is instructed by a user, the imaging result instructed by the user is read from the storage 11 and is decoded by the encoding/decoding section 9, whereby the image data is created. Then, the image data is image-processed by the image processing section 8. The image data based on the image processing result undergoes encoding processing by the encoding/decoding section 9 and is recorded in the storage 11. Thus, the image processing results for one picture plane are stored in a buffer memory for encoding processing. In this case, as described above with reference to FIG. 17, the capacity of the buffer memory can be increased.

Thus, in this embodiment, the encoded data recorded in the storage 11 of each image processing unit in the image processing section 8 is decoded by the encoding/decoding section 9 and is image-processed by the image processing section 8. The image-processed image data undergoes encoding processing by the encoding/decoding section 9, and the encoded data based on the processing result is held in the sorting section 10 (FIGS. 5 and 6). In the digital still camera 1, the decoding, image processing and encoding processing on image processing units are repeated in the order of image processing by the image processing section 8. Upon completion of processing for one picture plane, the encoded data pieces are sorted in the sorting section 10, and the encoded data pieces for one picture plane are recorded in the storage 11 in the order of encoding processing.

Thus, in the digital still camera 1, the buffer memory that records image processing results may only require the capacity enough for recording image data for an image processing unit, which can reduce the capacity of the buffer memory. The decrease in capacity can reduce the power consumption, further reduce the time for image processing and increase the operational time with a battery.

In performing decoding processing, image processing and encoding processing on image processing units in this way, the buffer memory that temporarily stores encoding processing results may also function as a buffer memory that temporarily stores image processing results, which can simplify the construction. The operations for encoding and decoding processing of the encoding/decoding section 9 may be switched in a time-division manner to perform a series of processes, which can simplify the construction.

However, in JPEG, wrong DC-coefficients are held by encoding the DC-values of macro blocks with difference values with respect to the DC values of the immediately preceding macro blocks (see FIGS. 7A and 7B) even though encoding data pieces are sorted and position information for locating macro blocks are redefined so as to address the sorting.

Thus, in the digital still camera 1, the series of processing is performed on image processing units, and the DC-values detected in encoding processing are recorded and held and are used in the latter encoding processing on image processing units. For the macro blocks the DC-values of which may not be prepared previously even by that, the DC-values are detected and used by decoding, image-processing and encoding the macro-blocks in the previous processing before the repetition of the series of processing (see FIGS. 8 to 11).

Thus, the digital still camera 1 may create encoded data, which is the same as that resulting from the collective encoding processing on data of one image, by performing the series of processing on image processing units and sorting the encoded data pieces.

Encoded data pieces are created by rotating the image in image processing units, macro block units or medium units therebetween by 180 degrees and then sorting the encoded pieces so as to correspond to the rotation of the image for one picture plane. Thus, the capacity of the buffer memory that temporarily stores image processing results can be reduced even with the rotation of images.

By the way, when encoded data is created by variable-length encoding, the amount of codes in one macro block may vary, which may more complicate the processing of sorting by the sorting section 10. Thus, in the digital still camera 1, the amount of codes of each macro block is detected by the encoding/decoding section 9, and, under the control of the central processing unit 3 based on the amount of codes, the encoded data pieces are sorted by the sorting section 10, which can sort the encoded data pieces more simply and securely.

[3] Effects of Embodiment

Under this construction, input encoded data pieces in image processing units, which are sequentially obtained from a storage, are decoded and undergo image processing and encoding processing, and then encoded data pieces are sorted, and the imaging results undergo decoding processing, image processing and encoding processing. Thus, the capacity of a buffer memory that temporarily stores image processing results can be reduced.

Furthermore, the encoding/decoding section that decodes encoded data and performs encoding processing on image data is alternately used in a time-division manner to perform decoding and encoding processing, which can simplify the construction therefor.

Recording and holding DC-values detected by encoding processing on serial image processing units for use in latter encoding processing in image processing units and detecting and holding DC-values, which may not be prepared with the serial image processing units by previous decoding, image processing and encoding and performing the latter encoding processing in image processing units with reference to the held DC-values can provide the same encoded data as the result to be provided by performing the series of processing in image processing units, sorting encoded data pieces and collectively performing encoding processing on data for one picture plane.

An image is rotated by rotating the image in image processing units, encoding processing units or medium processing units therebetween and sorting the encoded data pieces. Thus, the image rotation is allowed with the reduced capacity of a buffer memory that temporarily stores image processing results.

The detection of an amount of generated codes for each encoding processing unit and sort of encoded data pieces in an encoding processing unit based on the detection result allows the sort of encoded data pieces more easily and securely when image data undergoes encoding processing by adjustable length encoding.

Second Embodiment

Having described the case that the invention is applied to image processing including scaling-up or down and rotating according to the embodiment above, the invention is not limited thereto. The invention is widely applicable to image processing relating to various effects such as highlighting and further to various kinds of image processing such as distortion correction, chromatic aberration correction and noise reduction.

Having described the case that the DC-value, which is data to be transmitted as the difference value with respect to immediately preceding macro block, is recorded and used for latter encoding processing according to the embodiment above, the invention is not limited thereto. The processing above may be applied to various kinds of processing on data to be transmitted as difference data with respect to the immediately preceding macro block, Thus, the invention is widely applicable to the case that encoded data is created in various formats excluding JPEG.

Having described the case that encoding processing is performed on an image processing result in image processing units so as to prevent the insertion of staffing bits and delimiter codes according to the embodiment above, the invention is not limited thereto. Staffing bits or delimiter codes may be inserted, and the staffing bits or delimiter codes may be deleted in sorting by the sorting section. When a delimiter code is provided, encoding processing is performed on the DC value of the immediately preceding macro block to a DC coefficient thereof. Thus, in this case, the processing on the DC-coefficient may be further required to perform by creating a dummy macro block with the recorded and held DC-value, creating the encoded data with the succession of the dummy macro block, and then deleting the encoded data of the dummy macro block, for example. Notably, the dummy macro block may be actual image data of the macro block immediately before the macro block to be processed in the sorted encoded data.

Having described the case that a still image is processed by JPEG according to the embodiment above, the invention is not limited thereto. The invention is widely applicable to encoding processing in encoding processing units such as Moving Picture Experts Group (MPEG), for example.

Having described the case that the invention is applied to a digital still camera according to the embodiment above, the invention is not limited thereto. The invention is widely applicable to various image processing apparatus, image processing programs in a personal computer, a Personal Digital Assistants (PDA), an image transmitting apparatus, a mobile terminal, a cellular phone and so on.

The invention is applicable to a digital still camera, for example.

It should be understood by those skilled in the art that various modifications, combinations, sub-combinations and alterations may occur depending on design requirements and other factors insofar as they are within the scope of the appended claims or the equivalents thereof.

The invention claimed is:

1. An image processing method for decoding input encoded image data, which has undergone encoding processing by a predetermined format, image processing the decoded image data, and encoding the image-processed data to create output encoded data, the method comprising:

repeating the process of decoding, image processing and encoding processing and outputting the image data in image processing units subject to the image processing; and sorting the encoded data obtained from the repeated processing step and creating the output encoded data in an order defined by the format of the output encoded data for performing encoding processing on one picture plane, wherein the repeated processing step includes:

decoding the input encoded data in the image processing units and outputting image data;

image processing the decoded image data in the image processing units; and encoding processing the image-processed data in encoding processing units.

2. The image processing method according to claim 1, wherein the decoding and encoding steps are performed by alternately using an encoding/decoding section that decodes the input encoded image data and encodes the image-processed data.

3. The image processing method according to claim 1, wherein the repeated processing step includes recording and holding predetermined data detected by the encoding processing step so as to be available in a later encoding processing step, the image processing method further comprising:

obtaining the predetermined data, which, depending on the recording and holding step, may not be held so as to be available in the later encoding processing step;

the predetermined data being data to be transmitted with a difference value between a current encoding processing unit and an immediately preceding encoding processing unit;

the encoding processing step including creating the encoded data based on the predetermined data recorded in the recording and holding step and a previous processing in the repeated processing step; and the previous processing in the repeated processing step including:

decoding the input encoded data relating to the previous data and outputting decoded previous image data;

image-processing the decoded previous image data; and encoding processing the image-processed previous image data in encoding processing units and detecting the previous data obtained by the previous processing in the repeated processing step.

4. The image processing method according to claim 3, wherein the predetermined data is DC value data of the encoding processing unit.

5. The image processing method according to claim 1, wherein the output encoded data is data on an image resulting from rotation of the image based on the input encoded image data; and the repeated processing step rotates the image based on the input encoded image data by rotating the image in the image processing units, encoding processing units or intermediate processing units between the image processing units and the encoding processing units and then sorting the encoded data in the sorting step.

6. The image processing method according to claim 1, wherein the output encoded data is data on an image resulting from partial extraction of the image based on the input encoded image data.

7. The image processing method according to claim 1, wherein:

the encoding processing step includes creating the encoded data by variable-length encoding processing and detecting the amount of generated codes for each of the encoding processing units; and the sorting step includes sorting the encoded data in the encoding processing units based on the amounts of generated codes detected by the encoding processing step.

8. An image processing apparatus for decoding input encoded image data, which has undergone encoding processing by a predetermined format, image processing the decoded image data, and encoding the image-processed data to create output encoded data, the apparatus comprising:

a central processing unit;

a repeated processing section controllable by the central processing unit to repeat the process of decoding, image processing and encoding processing and outputting the image data in image processing units subject to the image processing; and a sorting section controllable by the central processing unit to sort the encoded data obtained from the repeated processing section and to create the output encoded data in an order defined by the format of the output encoded data for performing encoding processing on one picture plane, wherein the repeated processing section includes:

a decoding section operable to decode the input encoded data in the image processing units and to output image data;

an image processing section operable to image process the decoded image data in the image processing units; and an encoding section operable to encoding process the image-processed data in encoding processing units.

9. A non-transitory recording medium recorded with a program for causing computing processing means to execute an image processing method for decoding input encoded image data, which has undergone encoding processing by a predetermined format, image processing the decoded image data, and encoding the image-processed data to create output encoded data, the method comprising:

repeating the process of decoding, image processing and encoding processing and outputting the image data in image processing units subject to the image processing; and sorting the encoded data obtained from the repeated processing step and creating the output encoded data in an order defined by the format of the output encoded data for performing encoding processing on one picture plane, wherein the repeated processing step includes:

decoding the input encoded data in the image processing units and outputting image data;

image-processing the decoded image data in the image processing units; and encoding processing the image-processed data in encoding processing units.

* * * * *